US010693272B2

(12) United States Patent
Fidric et al.

(10) Patent No.: US 10,693,272 B2
(45) Date of Patent: *Jun. 23, 2020

(54) FIBER ENCAPSULATION MECHANISM FOR ENERGY DISSIPATION IN A FIBER AMPLIFYING SYSTEM

(71) Applicant: Waymo LLC, Mountain View, CA (US)

(72) Inventors: Bernard Fidric, Cupertino, CA (US); Daniel Rosenfeld, Mountain View, CA (US); Rahim Pardhan, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 15/691,917

(22) Filed: Aug. 31, 2017

(65) Prior Publication Data

US 2018/0109062 A1    Apr. 19, 2018

Related U.S. Application Data

(63) Continuation of application No. 15/294,886, filed on Oct. 17, 2016, now Pat. No. 9,787,048.

(51) Int. Cl.
*H01S 3/04* (2006.01)
*G01S 7/481* (2006.01)
(Continued)

(52) U.S. Cl.
CPC .......... *H01S 3/0405* (2013.01); *G01S 7/4818* (2013.01); *G01S 17/02* (2013.01);
(Continued)

(58) Field of Classification Search
CPC .... H01S 3/0405; H01S 3/067; H01S 3/06754; G02B 6/02395; G02B 6/4436
See application file for complete search history.

(56) References Cited

U.S. PATENT DOCUMENTS 4,969,705 A * 11/1990 Stoy ................ G02B 1/048
                                              156/158
7,782,527 B1 * 8/2010 Brooks ............... C03B 37/10
                                              359/341.1
(Continued)

FOREIGN PATENT DOCUMENTS

CA         2810351 A1    9/2014
CN     1005204117 A     12/2015

OTHER PUBLICATIONS

Extended European Search Report for European Patent Application No. 17196549.4, dated Apr. 5, 2018.
(Continued)

*Primary Examiner* — Eric L Bolda
(74) *Attorney, Agent, or Firm* — McDonnell Boehnen Hulbert & Berghoff LLP

(57) ABSTRACT

The present disclosure relates to a fiber encapsulation mechanism for energy dissipation in a fiber amplifying system. One example embodiment includes an optical fiber amplifier. The optical fiber amplifier includes an optical fiber that includes a gain medium, as well as a polymer layer that at least partially surrounds the optical fiber. The polymer layer is optically transparent. In addition, the optical fiber amplifier includes a pump source. Optical pumping by the pump source amplifies optical signals in the optical fiber and generates excess heat and excess photons. The optical fiber amplifier additionally includes a heatsink layer disposed adjacent to the polymer layer. The heatsink layer conducts the excess heat away from the optical fiber. Further, the optical fiber amplifier includes an optically transparent layer disposed adjacent to the polymer layer. The optically transparent layer transmits the excess photons away from the optical fiber.

21 Claims, 8 Drawing Sheets

(51) Int. Cl.
*H01S 3/067* (2006.01)
*G01S 17/02* (2020.01)
*G02B 6/02* (2006.01)
*G02B 6/255* (2006.01)
*H01S 3/094* (2006.01)
*H01S 3/16* (2006.01)
*H01S 3/042* (2006.01)
*H01S 3/08* (2006.01)
*G01S 17/10* (2020.01)
*H01S 3/0941* (2006.01)
*H01S 3/00* (2006.01)

(52) U.S. Cl.
CPC ....... *G02B 6/02395* (2013.01); *G02B 6/2551* (2013.01); *G02B 6/2558* (2013.01); *H01S 3/06754* (2013.01); *H01S 3/06758* (2013.01); *H01S 3/06783* (2013.01); *H01S 3/094003* (2013.01); *H01S 3/1603* (2013.01); *G01S 17/10* (2013.01); *H01S 3/005* (2013.01); *H01S 3/0064* (2013.01); *H01S 3/0078* (2013.01); *H01S 3/042* (2013.01); *H01S 3/06704* (2013.01); *H01S 3/0804* (2013.01); *H01S 3/09415* (2013.01); *H01S 3/094007* (2013.01); *H01S 3/094069* (2013.01); *H01S 3/1608* (2013.01); *H01S 3/1618* (2013.01); *H01S 2301/03* (2013.01)

(56) References Cited

U.S. PATENT DOCUMENTS

| | | | |
|---|---|---|---|
| 8,213,753 B2* | 7/2012 | Li | G02B 6/241 385/129 |
| 8,824,519 B1* | 9/2014 | Seurin | H01S 3/094053 372/50.124 |
| 8,934,509 B2 | 1/2015 | Savage-Leuchs et al. | |
| 2002/0191902 A1* | 12/2002 | Gao | C03B 37/01211 385/24 |
| 2003/0044103 A1* | 3/2003 | Kaneko | G02B 6/13 385/14 |
| 2003/0053776 A1 | 3/2003 | Dejneka et al. | |
| 2005/0100073 A1 | 5/2005 | Hughes, Jr. et al. | |
| 2006/0268395 A1 | 11/2006 | Steckl et al. | |
| 2008/0175595 A1* | 7/2008 | Dragic | H01S 3/06708 398/141 |
| 2008/0188843 A1* | 8/2008 | Appling | A61B 18/24 606/15 |
| 2009/0046746 A1 | 2/2009 | Munroe et al. | |
| 2010/0074586 A1* | 3/2010 | Panarello | G02B 6/4457 385/134 |
| 2011/0110625 A1 | 5/2011 | Chatigny | |
| 2011/0122895 A1 | 5/2011 | Savage-Leuchs et al. | |
| 2012/0045169 A1* | 2/2012 | Hu | B23K 1/0008 385/33 |
| 2012/0165801 A1* | 6/2012 | Bragagna | A61B 18/20 606/16 |
| 2013/0136146 A1 | 5/2013 | Creeden et al. | |
| 2013/0195403 A1 | 8/2013 | Hu | |
| 2014/0054021 A1* | 2/2014 | Xing | F28F 9/00 165/185 |
| 2014/0270637 A1* | 9/2014 | Desbiens | G02B 6/0288 385/29 |
| 2015/0138630 A1 | 5/2015 | Honea et al. | |
| 2015/0331209 A1 | 11/2015 | Pikulski et al. | |
| 2015/0370009 A1* | 12/2015 | Gapontsev | G02B 6/036 372/6 |
| 2016/0282468 A1* | 9/2016 | Gruver | H05K 999/99 |
| 2016/0291134 A1 | 10/2016 | Droz et al. | |
| 2017/0155225 A1 | 6/2017 | Villeneuve et al. | |

OTHER PUBLICATIONS

Rene Schneider et al. Transparent Silicone Calcium Fluoride Nanocomposite with Improved Thermal Conductivity. Macromolecular Materials and Engineering, vol. 300, No. 1, 2015, pp. 80-85.

"Controlling the 1 μm spontaneous emission in Er/Yb co-doped fiber amplifiers"; Grzegorz Sobon, et al.; Optics Express, vol. 19, No. 20; Sep. 16, 2011.

"Dual-Clad Erbium/Ytterbium Doped Fiber"; Newport Datasheet; www.newport.com; Nov. 8, 2013.

"Specialty Fibers: Active Fibers"; iXblue; retrieved archive copy from http://www.photonics.ixblue.com:80/products-list/active-fibers; webpage archived on Aug. 17, 2016.

Supplemental Declaration of Michael Lebby in Support of Defendants' Sur-Reply to Plaintiff Waymo LLC's Motion for Preliminary Injunction; *Waymo* v. *Uber Technologies, Inc., Ottomotto LLC; Otto Trucking LLC* in the Northern District of California, along with Exhibits 21-23; Case 3:17-cv-00939-WHA; Document 309; Filed Apr. 28, 2017.

Tutorial "Fiber Amplifiers", Part 10; https://www.rp-photonics.com/tutorial_fiber_amphfiers10.html; retrieved Sep. 6, 2016.

Extended European Search Report dated Sep. 4, 2019 for European Patent Application No. 19166320.2.

* cited by examiner

FIBER ENCAPSULATION MECHANISM FOR ENERGY DISSIPATION IN A FIBER AMPLIFYING SYSTEM

CROSS-REFERENCE TO RELATED APPLICATIONS

The present application is a continuation application claiming priority to Non-Provisional patent application Ser. No. 15/294,886, filed Oct. 17, 2016, the contents of which are hereby incorporated by reference.

BACKGROUND

Unless otherwise indicated herein, the materials described in this section are not prior art to the claims in this application and are not admitted to be prior art by inclusion in this section.

Optical fiber lasers and amplifiers are used to radiate light at specific wavelengths, typically at relatively high intensities. Lasers and amplifiers generally include one or more amplifier stages, each including a length of active optical fiber typically coupled to one or more pump radiation sources (e.g., pump lasers) and configured to amplify optical radiation passing through a core.

The output power of optical fiber lasers and amplifiers is being continuously scaled up by designers. However, attempting to scale the output power can introduce problems, such as adverse energy dissipation effects. One intrinsic loss due to the pumping process results from the so-called quantum defect. The quantum defect is defined as the ratio of the pump wavelength to the lasing wavelength, and as such, acts as a measure of the amount of pump energy that is not carried by the amplified radiation, and thus is converted to excess energy within the fiber. Such energy can result in negative thermal effects or negative radiation effects (e.g., spontaneously emitted photons escaping from the fiber and not contributing to amplification of the electromagnetic radiation in the core). This can be particularly problematic in active optical fibers doped with elements having high quantum defect values. Another loss mechanism results from the emission of phonons (i.e., lattice vibrations). Such phonons can lead to an increase in thermal energy of the amplifier. In severe cases, the fiber itself can experience degradation due to overwhelming heating because of the associated energy dissipation effects. This is particularly the case for high peak power fiber amplifiers where the active doped fibers absorb the pump energy over a relatively short distance in order to mitigate substantial adverse non-linear optical effects (e.g., stimulated Brillouin scattering or stimulated Raman scattering).

Since a substantial fraction of the gain in an optical fiber amplifying system usually takes place within the portion of the active optical fiber that is nearest to the pump optical source (e.g., within a few centimeters of the end of the fiber coupled to the pump source), the thermal effects can be most pronounced in this region. This can be particularly problematic near fusion splices, sometimes called "critical junctions". Thus, the fusion splices can be the first section of an optical fiber amplifying system to fail if the thermal effects are not adequately accounted for.

Therefore, in order for optical fiber amplifiers and lasers to maximize power output, an effective means of handling the adverse energy dissipation effects in such systems without adversely affecting other aspects of the system, can be desired.

SUMMARY

The specification and drawings disclose embodiments that relate to a fiber encapsulation mechanism for energy dissipation in a fiber amplifying system.

An example fiber encapsulation structure within an optical fiber amplifier may allow for energy dissipation. The optical fiber amplifier may include an active, dual-clad optical fiber that is optically pumped to amplify a signal. When amplifying the signal, the active, dual-clad optical fiber may generate excess photons and excess heat. The fiber encapsulation structure may surround one or more sections of the active, dual-clad optical fiber. For example, the fiber encapsulation structure may surround a section of the active, dual-clad optical fiber from which a second cladding has been stripped. Further, the fiber encapsulation structure may conduct the excess photons and the excess heat away from the optical fiber. In order to conduct the excess photons and the excess heat away from the optical fiber, the fiber encapsulation structure may include a polymer layer, a heatsink layer adjacent to the polymer layer, and an optically transparent layer adjacent to the polymer layer opposite the heatsink layer.

In a first aspect, the disclosure describes an optical fiber amplifier. The optical fiber amplifier includes an optical fiber that includes a gain medium. The optical fiber amplifier also includes a polymer layer that at least partially surrounds the optical fiber. The polymer layer is optically transparent. Further, the optical fiber amplifier includes a pump source configured to optically pump the optical fiber. Optical pumping by the pump source amplifies optical signals in a wavelength range transmitted through the gain medium of the optical fiber and generates excess heat and excess photons. The optical fiber amplifier additionally includes a heatsink layer disposed adjacent to the polymer layer. The heatsink layer conducts the excess heat away from the optical fiber. The optical fiber further includes an optically transparent layer disposed adjacent to the polymer layer opposite the heatsink layer. The optically transparent layer transmits the excess photons away from the optical fiber.

In a second aspect, the disclosure describes a method. The method includes optically pumping, by a pump source, an optical fiber that includes a gain medium. Optically pumping by the pump source amplifies optical signals in a wavelength range transmitted through the gain medium of the optical fiber and generates excess heat and excess photons. The method also includes transmitting, to a polymer layer that at least partially surrounds the optical fiber, the excess heat and the excess photons. The polymer layer is optically transparent. In addition, the method includes conducting, by a heatsink layer disposed adjacent to the polymer, the excess heat away from the optical fiber. The method further includes conducting, by an optically transparent layer disposed adjacent to the polymer layer opposite the heatsink layer, the excess photons away from the optical fiber.

In a third aspect, the disclosure describes a method of assembling an optical fiber amplifier. The method includes connecting an output end of a pump source to an input end of an optical fiber. The optical fiber includes a gain medium. The pump source is configured to optically pump the optical fiber to amplify optical signals in a wavelength range transmitted through the gain medium of the optical fiber. Optically pumping the optical fiber to amplify optical signals generates excess heat and excess photons. The method also includes placing at least a portion of the optical fiber adjacent to a heatsink layer. The heatsink layer conducts the excess heat away from the optical fiber. In addition, the method includes surrounding the portion of the optical fiber adjacent to the heatsink layer with a polymer layer. The polymer layer is optically transparent. Further, the method includes placing an optically transparent layer adjacent to the polymer layer opposite the heatsink layer. The optically transparent layer transmits the excess photons away from the optical fiber.

In an additional aspect, the disclosure describes a system. The system includes a means for optically pumping an optical fiber that includes a gain medium. The means for optically pumping amplifies optical signals in a wavelength range transmitted through the gain medium of the optical fiber and generates excess heat and excess photons. The system also includes a means for transmitting, to a polymer layer that at least partially surrounds the optical fiber, the excess heat and the excess photons. The polymer layer is optically transparent. In addition, the system includes a means for conducting the excess heat away from the optical fiber. The means for conducting the excess heat away from the optical fiber is disposed adjacent to the polymer. The system further includes a means for conducting the excess photons away from the optical fiber. The means for conducting the excess photons away from the optical fiber is disposed adjacent to the polymer layer opposite the means for conducting the excess heat away from the optical fiber.

Additionally, the disclosure describes a system for assembling an optical fiber amplifier. The system includes a means for connecting an output end of a pump source to an input end of an optical fiber. The optical fiber comprises a gain medium. The pump source is configured to optically pump the optical fiber to amplify optical signals in a wavelength range transmitted through the gain medium of the optical fiber. Optically pumping the optical fiber to amplify optical signals generates excess heat and excess photons. The system also includes a means for placing at least a portion of the optical fiber adjacent to a heatsink layer. The heatsink layer conducts the excess heat away from the optical fiber. In addition, the system includes a means for surrounding the portion of the optical fiber adjacent to the heatsink layer with a polymer layer. The polymer layer is optically transparent. Further, the system includes a means for placing an optically transparent layer adjacent to the polymer layer opposite the heatsink layer. The optically transparent layer transmits the excess photons away from the optical fiber.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
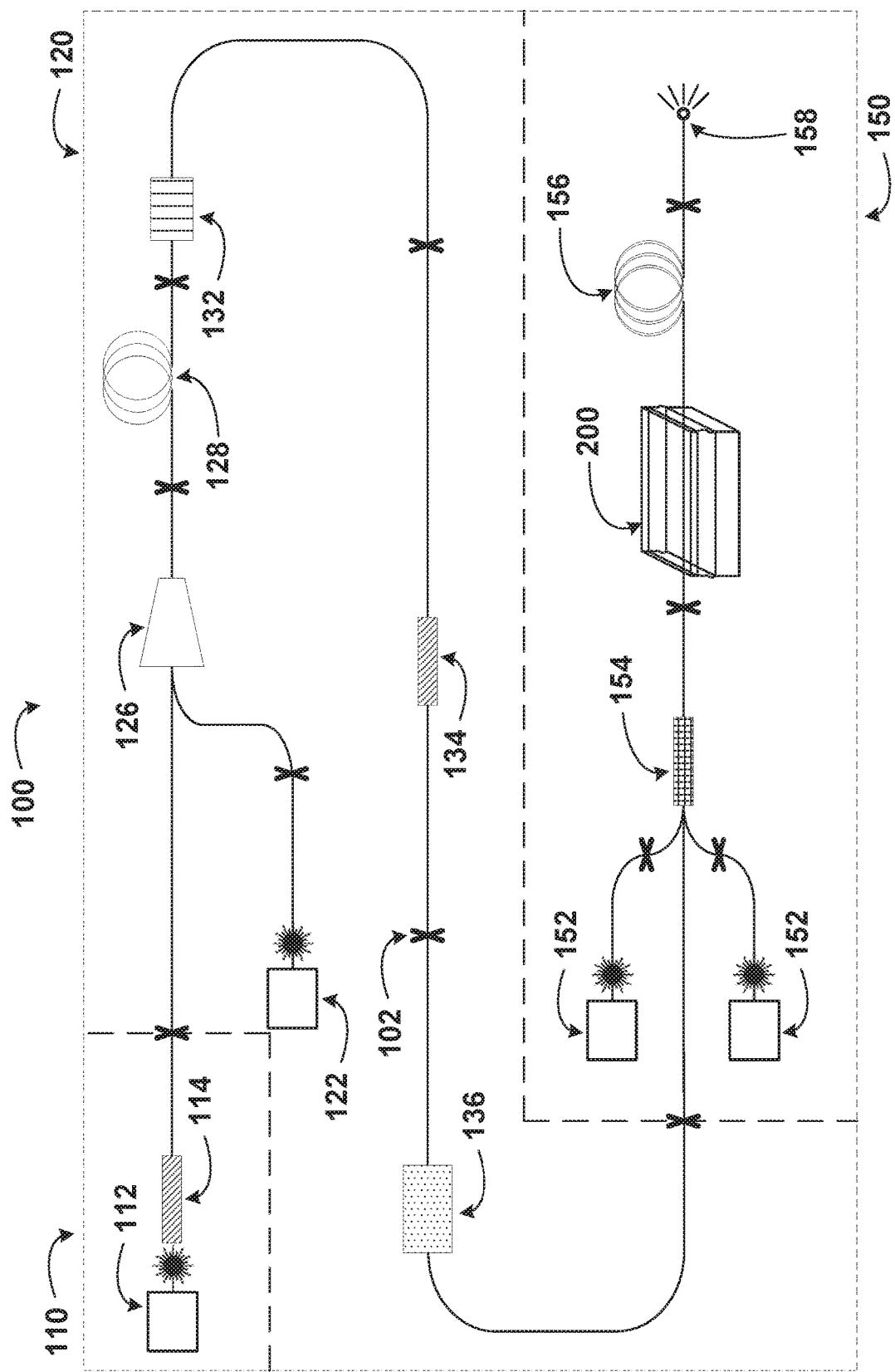
FIG. 1A is a schematic of an optical fiber amplifier, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

Still further, the terms "optical", "optically", etc., as used herein, are not meant to limit the embodiments to applications that use visible wavelengths. In various embodiments, both explicitly and implicitly contemplated herein, other wavelength ranges may be used. For example, electromagnetic radiation having an infrared wavelength (e.g., 1.55 µm) may be transmitted down an optical fiber, as described herein.

I. Overview

Example embodiments may relate to devices, systems, and methods for extracting excess energy from an optical fiber within an optical fiber amplifier (e.g., an optical fiber amplifier for use in a transmitter of a light detection and ranging, LIDAR, system). For example, an active, dual-clad optical fiber that is part of the second gain stage of an optical fiber amplifying system may generate excess energy in the form of heat (i.e., phonons) or light (i.e., photons) while amplifying radiation in a core of the active, dual-clad optical fiber. This energy may be removed from the vicinity of the active, dual-clad optical fiber and radiated away to prevent degradation of the active, dual-clad optical fiber/optical fiber amplifying system.

A specific example embodiment may include a fiber encapsulation structure having an optical fiber submersed in an optically transparent polymer. The polymer may be sandwiched between a heatsink (e.g., copper) and an optically transparent layer (e.g., glass). The fiber encapsulation structure may be fabricated according to a specific process. For example, the polymer may be liquefied, and then poured (or injected) on top of the heatsink. The optical fiber may then be placed into the polymer. Next, the optically transparent layer may be positioned above and along the optically transparent polymer to define a height of the optically transparent polymer region. The optically transparent polymer may then be allowed to cure. As the optically transparent polymer is cured, it may solidify, thus holding the optical fiber in place and also adhering to and supporting the optically transparent layer.

In various embodiments, various subsections of the optical fiber amplifier may reside in the polymer region. For example, a portion of a second stage of an optical fiber amplifying system (e.g., an active, dual-clad optical fiber) may reside in the polymer. Further, in some embodiments, only a portion of an optical fiber may reside in the polymer (e.g., the section of the active, dual-clad optical fiber nearest to a fusion splice). This may be a feature designed to account for the fact that a majority of the amplification, and thus a majority of the adverse energy generation effects, may occur within a first region of the optical fiber.

In some embodiments, the active optical fiber within the optically transparent polymer may be an entirely dual-clad optical fiber. For example, the active optical fiber may guide electromagnetic radiation of a signal wavelength in a core region and electromagnetic radiation of a pump wavelength in a first cladding region. To do so, the optical fiber may be designed with a low refractive index second cladding to assist in containing the pump radiation within the first cladding. In alternate embodiments, the active optical fiber may only include a single cladding. In such embodiments, the polymer region may have a low enough refractive index to serve the purpose of the second cladding by ensuring the pump light is efficiently guided within the first cladding of the active optical fiber (i.e., the polymer region may act as a surrogate second cladding region based upon the polymer region's refractive index).

The polymer, itself, can be conductive to both thermal energy and photonic energy. As excess energy is generated by the active optical fiber (e.g., in a region immediately after the fusion splice where the absorption of the pump energy is the highest), the excess energy is imparted to the polymer. The thermal energy eventually makes its way to the heatsink, where it is extracted from the fiber encapsulation structure, and the photonic energy eventually makes its way to the optically transparent layer where it is radiated away from the fiber encapsulation structure. This may not occur directly, however. For example, if a photon is emitted from the active optical fiber comes into contact with the heatsink, the photon may be reflected back to the interior of the fiber encapsulation structure (e.g., back toward a center of the polymer). The photon may be reflected by one of the segments of the active optical fiber, again toward the heatsink. This may occur multiple times before the photon is eventually directed to the optically transparent layer and radiated out of the fiber encapsulation structure. To increase the thermal conductivity of the polymer, the polymer may have materials embedded therein (e.g., the polymer may be doped with other materials) that have a high thermal conductivity (e.g., Boron Nitride, Alumina, Silica, or other minerals, including $MgF_2$ or $CaF_2$).

As the polymer region is typically amorphous, and defined by the shape of the structures containing it as it cures, the polymer can take on various shapes. In some embodiments, the shape of the polymer will be a slab, defined between two other slabs (e.g., the optically transparent layer and the heatsink). Alternatively, the polymer could be shaped cylindrically if defined between two half-cylindrical shells (e.g., an optically transparent, half-cylindrical shell and a heatsink, half-cylindrical shell). Other shapes of the polymer are also possible.

II. Example Systems

The following description and accompanying drawings will elucidate features of various example embodiments. The embodiments provided are by way of example, and are not intended to be limiting. Specifically, it is understood that the scale and dimensions of various components may not reflect actual reductions to practice. For example, the optical fibers illustrated in the accompanying drawings may be many times larger (e.g., with respect to the heatsink layer, the polymer layer, or the optically transparent layer) in the drawings than would reasonably be expected, so as to clearly illustrate the features of the optical fibers.

FIG. 1A is a schematic of an optical fiber amplifier 100, according to example embodiments. The optical fiber amplifier 100 may contain multiple stages, as illustrated in FIG. 1A by the sections separated by dashed lines. The optical fiber amplifier 100 may include a seeding stage 110, a preamplifying stage 120, and a booster amplifying stage 150. The seeding stage 110 may include a pulsed seed laser 112 and a built-in isolator 114. The preamplifying stage 120 may include a single-mode pump diode 122, a wavelength-division multiplexer (WDM) 126, an active single-mode optical fiber 128, an amplified spontaneous emission (ASE) filter 132, an optical isolator 134, and a mode scrambler 136. The booster amplifying stage 150 may include multimode pump lasers 152, a multimode combiner 154, a fiber encapsulation structure 200, an active, dual-clad optical fiber 156, and an end emitter 158. The various stages and the various optical components within each stage of the optical fiber amplifier 100 may be connected to one another at fusion splices 102 (indicated in FIG. 1A by an "X" symbol). Other arrangements of components, as well as additions or subtractions of components, may be used in various embodiments.

Figure 1B:
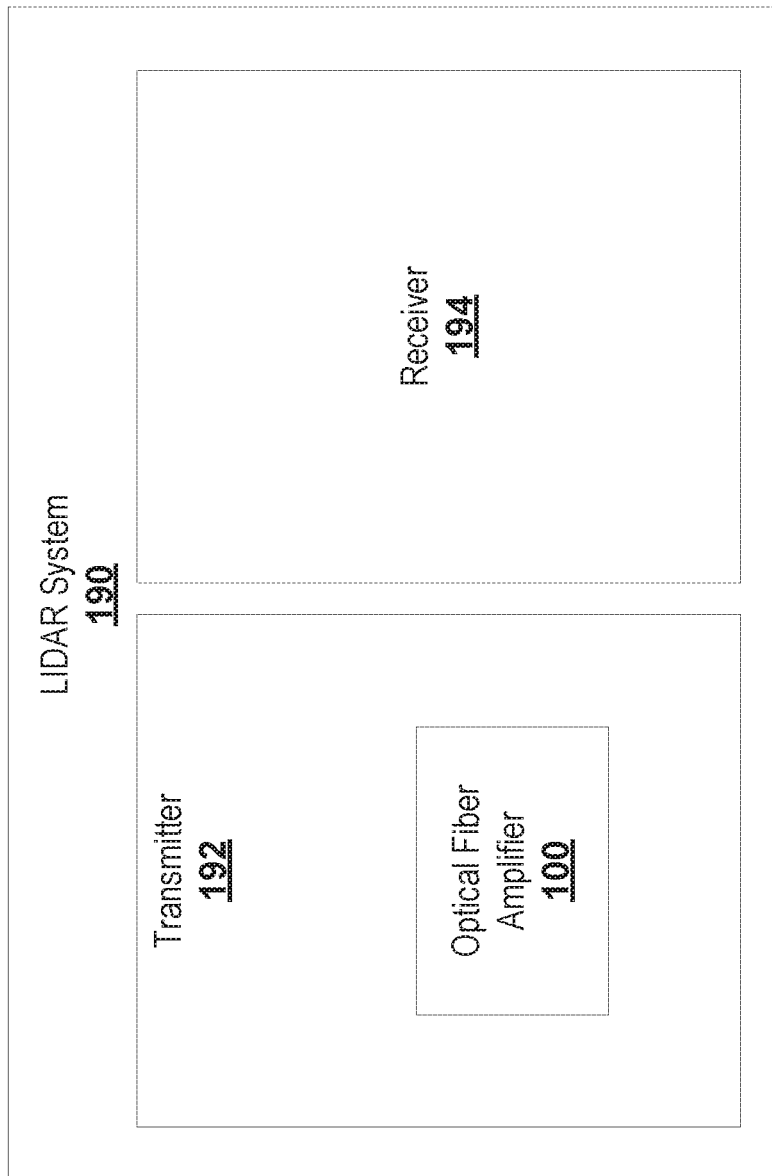
FIG. 1B is a block diagram of a LIDAR system, according to example embodiments.

FIG. 1B is a block diagram of a LIDAR system 190, according to example embodiments. The LIDAR system 190 includes a transmitter 192 and a receiver 194. The transmitter includes the optical fiber amplifier 100 illustrated in FIG. 1A. The LIDAR system 190 may be used for navigation within an autonomous vehicle, for example.

In example embodiments, a signal may be emitted from the optical fiber amplifier 100 within the transmitter 192. The signal may be scattered by objects within a scene and consequently detected by the receiver 194 (e.g., by one or more light detectors within the receiver 194) of the LIDAR system 190 to analyze the scene (e.g., to determine the shape of the object or the object's distance from the LIDAR system 190). In some embodiments, the signal emitted from the optical fiber amplifier 100 may have a wavelength of between 880 nm and 920 nm (e.g., 900 nm for short range or midrange LIDAR applications). In alternate embodiments, the signal emitted from the optical fiber amplifier 100 may have a wavelength of between 1.525 µm and 1.565 µm (e.g., 1.55 µm for long range LIDAR applications). In still other embodiments, the signal emitted from the optical fiber amplifier 100 may have a wavelength of between 1.03 µm and 1.07 µm (e.g., 1.05 µm). Further, the power emitted by the optical fiber amplifier 100 may be below the maximum "eye safe" power limit for a Class 1 laser system (specified by the IEC 60825-1 standard), in some embodiments. The receiver 194 may include components in addition to the light detector(s), such as lenses, stages, filters, a computing device, etc.

Many of the components of the optical fiber amplifier 100 have optical fibers (e.g., integrated or embedded optical fibers) as inputs or outputs. Thus, the fusion splices 102 may provide a coupling mechanism for these components. The fusion splices 102 may be created by heating the two optical fibers to be fused (e.g., using a gas flame, a laser, or an electric arc). Further, creation of the fusion splices 102 between two, or more, optical fibers may include stripping one or multiple of the optical fibers, cleaning one or multiple of the optical fibers, cleaving one or multiple of the optical fibers, and splicing the optical fibers (e.g., using a commercial fusion splicer).

The seeding stage 110 may be the stage of the optical fiber amplifier 100 that generates the electromagnetic radiation that is to be amplified by the optical fiber amplifier 100. This electromagnetic radiation may be referred to as the "seed radiation", the "signal radiation" or the "output radiation". Other names for this electromagnetic radiation are also possible. A wavelength of the signal radiation may be selected by a fiber amplifier designer to correspond with the amplification mechanism that is provided at other stages of the optical fiber amplifier 100. For example, if later stages of the optical fiber amplifier 100 include erbium-doped, dual-clad optical fibers as a gain mechanism for amplifying the signal radiation, the signal radiation may have a wavelength between 1.525 μm and 1.565 μm (e.g., 1.55 μm).

The pulsed seed laser 112 may emit electromagnetic radiation having the wavelength of the signal radiation. In some embodiments, the pulsed seed laser 112 may be an electrically pumped laser diode. The pulsed seed laser 112 may be pulsed (e.g., having pulses between 1 ns and 10 ns in duration). When compared with a continuous wave (CW) laser, the pulsed seed laser 112, and consequently the optical fiber amplifier 100, may output a higher peak power while maintaining an equivalent average power. This may serve to partially mitigate excess energy emission (e.g., heat generation) that occurs within the active portions of the optical fiber amplifier 100 (e.g., the booster amplifying stage 150). However, in alternate embodiments, a CW seed laser may instead be used. Additionally, in some embodiments, multiple seed lasers may be used in the seeding stage 110 (e.g., two CW seed lasers). The pulsed seed laser 112 may have the following emission specifications, in example embodiments: wavelength of 1542 nm; pulses of 3 ns duration occurring at 150 kHz; and 0.1 W of peak power output, which corresponds to 45 μW of continuous power output.

The built-in isolator 114 may be a component of the seeding stage 110, as illustrated In FIG. 1A. In alternate embodiments, the built-in isolator 114 may be a sub-component of the pulsed seed laser 112. The built-in isolator 114 may include non-reciprocal optics that only allow unidirectional transmission of light. As such, the built-in isolator 114 may prevent feedback (e.g., reverse propagating electromagnetic radiation, such as electromagnetic radiation that was reflected at one of the fusion splices 102) from being transmitted to the pulsed seed laser 112 from the rest of the optical fiber amplifier 100. As illustrated, an output of the built-in isolator 114 may be connected to an input of a WDM 126 within the preamplifying stage 120.

The preamplifying stage 120 may be provided as a first of two gain stages of the optical fiber amplifier 100. The preamplifying stage 120 may have a relatively low mode area when compared with the booster amplifying stage 150. This may permit the preamplifying stage 120 to experience higher gain efficiency than the booster amplifying stage 150. Further, the relatively low mode area may permit the preamplifying stage 120 to incorporate single-mode fibers (such as the active single-mode optical fiber 128). The active single-mode optical fiber 128 may have enhanced optical guiding characteristics when compared with multi-mode fibers. This may allow for tight coiling of the active single-mode optical fiber 128, and thus a more compact physical arrangement of the preamplifying stage 120 than the booster amplifying stage 150.

The single-mode pump diode 122 may be the pump source for the preamplifying stage 120 of the optical fiber amplifier 100. Alternate pump sources (e.g., other optical fiber amplifiers or lasers) may be used instead of or in addition to the single-mode pump diode 122, in various embodiments. The single-mode pump diode 122 may provide pump radiation at a wavelength that corresponds to a gain medium being used within the optical fiber amplifier 100 (e.g., within the preamplifying stage 120 of the optical fiber amplifier 100) to provide gain for the transmitted optical signals. For example, for a gain medium that includes erbium within the active single-mode optical fiber 128, the single-mode pump diode 122 may provide radiation having a wavelength centered on 980 nm or 1.48 μm. As illustrated, an output of the single-mode pump diode 122 may be connected to the WDM 126. Some of the benefits of a decreased mode area presented with respect to the description of the preamplifying stage 120 may be enabled by the use of the single-mode pump diode 122. In some embodiments, the preamplifying stage 120 may additionally or alternatively include a multimode source.

The WDM 126 is configured to take multiple inputs (e.g., two as illustrated in FIG. 1A), and multiplex them onto a single output. For example, the WDM 126 may take an input from the single-mode pump diode 122 and another from the built-in isolator 114, and multiplex them together onto an output fiber that is connected to an active single-mode optical fiber 128. In this case, the signal radiation and the pump radiation co-propagate in the active single-mode optical fiber 128 (i.e., the active single-mode optical fiber 128 is being pumped in a co-pumped configuration).

The active single-mode optical fiber 128 may be a silica fiber that includes a gain medium to provide amplification during transmission of the pump and the signal radiation down the active single-mode optical fiber 128. For example, the active single-mode optical fiber 128 may be doped with erbium, ytterbium, thulium, or other rare earth elements. Other gain media, including elements that are not rare earth elements, are also possible. The active single-mode optical fiber 128 may use such dopants to amplify the electromagnetic radiation from the pulsed seed laser 112. This may occur through the physical process of stimulated emission. The active single-mode optical fiber 128 may have a core region surrounded by a cladding. Further, in some embodiments, the active single-mode optical fiber 128 may be configured to permit only the fundamental transverse electromagnetic mode (i.e., $TEM_{00}$) to propagate down the active single-mode optical fiber 128. As illustrated, an output of the active single-mode optical fiber 128 may be connected to an input of the ASE filter 132.

The ASE filter 132 may prevent transmission of ASE noise. For example, the ASE filter 132 may have a pass band that includes the wavelength range being amplified within the active single-mode optical fiber 128, but excludes the wavelength range of any ASE noise. In some embodiments, the mechanism for amplifying the seed radiation may be stimulated emission. Thus, extraneous amplified spontaneous emission may hinder the performance of the optical fiber amplifier 100. As such, the ASE filter 132 may prevent such adverse effects. As illustrated, an output of the ASE filter 132 may be connected to an input of the optical isolator 134.

The optical isolator 134 may serve a similar purpose to the built-in isolator 114, in example embodiments. Analogous to the built-in isolator 114, the optical isolator 134 may also include non-reciprocal optics. The optical isolator 134 may prevent feedback (e.g., reverse propagating electromagnetic radiation, such as electromagnetic radiation that was reflected at one of the fusion splices 102, or electromagnetic radiation emission from the booster amplifying stage 150 that is propagating in the backward direction) from being transmitted back to the ASE filter 132 or the active single-mode optical fiber 128. As illustrated, an output fiber of the optical isolator 134 may be connected to an input fiber of the mode scrambler 136.

The mode scrambler 136 may convert the single-mode, or nearly single-mode, output of the optical isolator 134 into a multimode output. The mode scrambler 136 may include a step-graded-step (S-G-S) configuration of fibers, which is a set of a step-index profile fiber, a graded-index profile fiber, and another step-index profile fiber connected in sequence (step-index and graded-index referring to the refractive index profile within the fiber from center to outer radius). Additionally or alternatively, the mode scrambler 136 may include a step-index fiber with bends, which is a step-index optical fiber having many bends of small radius (based on wavelength). As illustrated, an output fiber of the mode scrambler 136 may be connected to an input fiber of the multimode combiner 154 of the booster amplifying stage 150. At the output of the mode scrambler 136, the waveform of electromagnetic radiation may be an amplified/modified version of that output by the pulsed seed laser 112. For example, the output of the mode scrambler 136 may have the following characteristics: wavelength of 1542 nm; pulses of 2.5 ns duration occurring at 150 kHz; and 500 W of peak power output, which corresponds to 187.5 mW of continuous power output.

The booster amplifying stage 150 may be provided as a second of two gain stages of the optical fiber amplifier 100. The active, dual-clad optical fiber 156 within the booster amplifying stage 150 may have a relatively high mode area when compared with the active single-mode optical fiber 128 within the preamplifying stage 120. This may permit the booster amplifying stage 150 to experience reduced nonlinear optical effects when compared with alternate lower mode area fibers at equivalent power densities. Further, the relatively high mode area may permit the active, dual-clad optical fiber 156 within the booster amplifying stage 150 to have an increased ratio of core to cladding than would otherwise be possible, thereby improving pump absorption, and decreasing the length of fiber that is used to obtain a given amount of amplification.

The multimode pump lasers 152 may be the pump sources for the booster amplifying stage 150 of the optical fiber amplifier 100. Alternate pump sources (e.g., other optical fiber amplifiers or lasers) may be used instead of or in addition to the multimode pump lasers 152, in various alternate embodiments. The multimode pump lasers 152 may provide pump radiation at a wavelength that corresponds to a gain medium within the booster amplifying stage 150 (e.g., within the active, dual-clad optical fiber 156). For example, if the gain medium includes erbium and ytterbium, the multimode pump lasers 152 may provide pump radiation having a wavelength centered between 920 nm and 980 nm (e.g., 950 nm). As illustrated, output fibers of the multimode pump lasers 152 may be connected to input fibers of the multimode combiner 154. Some of the benefits of an increased mode area presented with respect to the description of the booster amplifying stage 150 may be enabled by the use of the multimode pump lasers 152 (in tandem with the multimode output from the mode scrambler 136).

The multimode combiner 154 may combine inputs from the multimode pump lasers 152 and an input from the mode scrambler 136 into a single output fiber. As in the embodiment of FIG. 1A, the multimode combiner 154 may be a (2+1)×1 combiner. Further, as illustrated, the multimode pump lasers 152 and the fiber output from the mode scrambler 136 may be fusion spliced onto exposed fibers of the multimode combiner 154. Alternatively, fiber pigtails may be used to adjoin the multimode pump lasers or the fiber output from the mode scrambler to the multimode combiner. In alternate embodiments of the booster amplifying stage, where there are more multimode pump lasers, the multimode combiner may have a greater number of input ports. As illustrated, an output of the multimode combiner 154 may be connected to an input of the active, dual-clad optical fiber 156. In some embodiments, the output of the multimode combiner 154 may be a dual-clad optical fiber having the pump radiation from the multimode pump lasers 152 confined to a cladding region and the signal radiation from the output of the mode scrambler 136 confined to a core region. For example, the dual-clad optical fiber output may be a passive optical fiber (i.e., an optical fiber not doped with a gain medium).

The fiber encapsulation structure 200 may be used to alleviate excess energy generation effects (e.g., excess photons or excess heat) that arise when optically pumping the active, dual-clad optical fiber 156 (i.e., when the active, dual-clad optical fiber 156 is amplifying signal radiation). The fiber encapsulation structure 200 may surround the active, dual-clad optical fiber 156 for portions of the active, dual-clad optical fiber 156. In some embodiments, the fiber encapsulation structure may surround the active, dual-clad optical fiber for the entire length of the active, dual-clad optical fiber. Additionally, the fiber encapsulation structure 200 may surround the fusion splice 102 between the output fiber of the multimode combiner 154 and the active, dual-clad optical fiber 156 (e.g., the fusion splice 102 may be embedded within the polymer layer 206). The fiber encapsulation structure 200 is described in further detail with respect to FIG. 2.

The active, dual-clad optical fiber 156 may be the region of the optical fiber amplifier 100 where a majority of the amplification occurs. For example, the active, dual-clad optical fiber 156 may have a core that includes a gain medium (e.g., doped with a rare earth element, such as erbium, ytterbium, or thulium) that amplifies a signal in the core through the process of stimulated emission. In order to achieve gain, pump radiation may be guided in a first cladding region, and used to excite the dopants. A second cladding may be included in the active, dual-clad optical fiber 156 to contain the pump radiation within the first cladding. For example, the refractive index profile within the active, dual-clad optical fiber 156 may defined such that the signal radiation is substantially confined to the core and the pump radiation is substantially confined to the first cladding and the core (e.g., the refractive index of the core is greater than the refractive index of the first cladding, which are both greater than the refractive index of the second cladding). The second cladding may be able to withstand temperatures up to 125 degrees Celsius, in some embodiments. The second cladding may include acrylate doped with fluorine, in various embodiments. In an example embodiment, the active, dual-clad optical fiber 156 may have an erbium/ytterbium-doped core, a first cladding layer of fused silica (having a refractive index between 1.44 and 1.46), and a second cladding layer of a low-index polymer (having a refractive index between 1.37 and 1.4).

The amplification in the active, dual-clad optical fiber 156 can lead to peak power densities that are large enough to induce substantial non-linear optical effects. The non-linear optical effects may include, for example, self-phase modulation (SPM), stimulated Brillouin scattering (SBS), or stimulated Raman scattering (SRS). Many non-linear optical effects have a strong dependence on interaction length (i.e., the fiber length over which the pump radiation and the signal radiation interact to stimulate amplification). As such, to mitigate non-linear optical effects, the active, dual-clad optical fiber 156 may have an optimized length (i.e., the length of the active, dual-clad optical fiber 156 may be as short as possible while achieving the desired amount of amplification). For example, the active, dual-clad optical fiber 156 may be 2 meters in length or less.

In some embodiments, the active, dual-clad optical fiber 156 may additionally include a jacket, surrounding the second cladding, to mechanically protect the fiber from wear. Further, the core, the first cladding, and the second cladding may not be concentric to one another. By breaking the circular symmetry (i.e., by not having the components placed concentric to one another), there may be a greater overlap of modes between the pump radiation and the signal radiation, thereby increasing amplification over the same relative distance. Even further, the sections of the active, dual-clad optical fiber 156 (i.e., the core, the first cladding, and the second cladding) may not have circular shapes, in various embodiments. For example, in some embodiments, the first cladding may have a hexagonal shape to increase reflections of pump radiation toward the core. In alternate embodiments, the active, dual-clad optical fiber may be partially or wholly replaced with another type of gain fiber (e.g., a fiber having only a single cladding).

As illustrated, an output of the active, dual-clad optical fiber 156 may be connected to an input of the end emitter 158. Also as illustrated, the input of the active, dual-clad optical fiber may be connected to the output fiber of the multimode combiner 154. The pump radiation coupled to the first cladding of the active, dual-clad optical fiber 156 may be transmitted to the active, dual-clad optical fiber 156 from the cladding of the output fiber of the multimode combiner 154. Further, the signal radiation coupled to the core of the active, dual-clad optical fiber 156 may be transmitted to the active, dual-clad optical fiber 156 from the core of the output fiber of the multimode combiner 154. To form an effective fusion splice between the output fiber of the multimode combiner 154 and the input of the active, dual-clad optical fiber 156, the second cladding, and any jacket surrounding the second cladding, of the active, dual-clad optical fiber 156 may be stripped from the active, dual-clad optical fiber 156 prior to creating the fusion splice 102.

The end emitter 158 provides a termination to the active, dual-clad optical fiber 156. As such, the end emitter 158 further provides a termination to the optical fiber amplifier 100. As illustrated, the end emitter 158 may transmit electromagnetic radiation (e.g., radiation of the signal wavelength) away from the optical fiber amplifier 100. The end emitter 158 may include an end-cap at the end of the fiber to expand the electromagnetic radiation beam prior to the beam exiting from the active, dual-clad optical fiber 156 into free space. In some embodiments, the end emitter may include additional free space optics to radiate the signal. In such embodiments, the end emitter may include a lens or a mirror. The electromagnetic radiation emitted from the end emitter 158 may have a high average power (e.g., between 1 W and 20 W) and a high peak power (e.g., between 1 kW and 100 kW) relative to the signal power provided by the pulsed seed laser 112.

Figure 2:
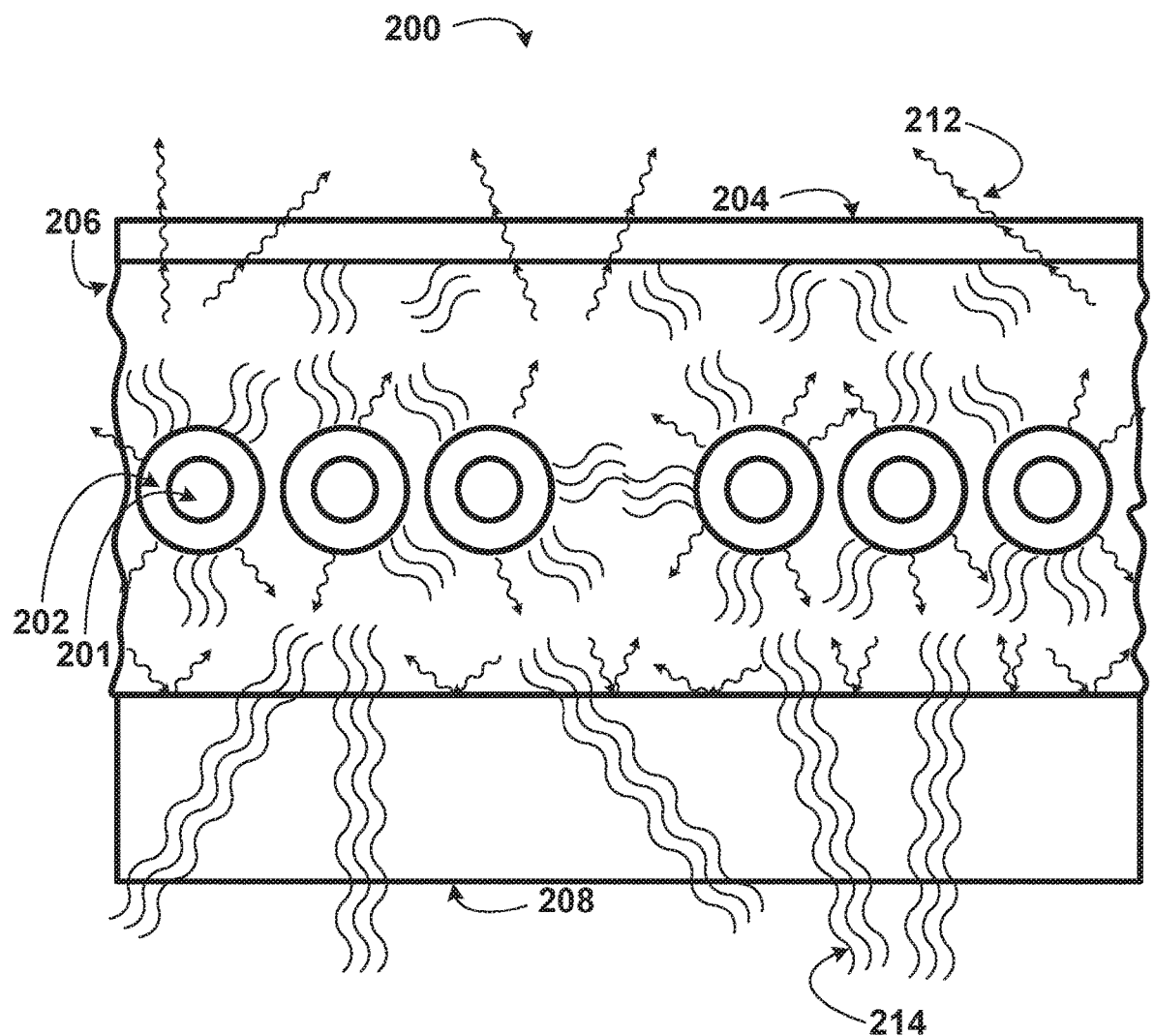
FIG. 2 is a cross-sectional illustration of a fiber encapsulation structure, according to example embodiments.

FIG. 2 is a cross-sectional illustration of the fiber encapsulation structure 200 that is illustrated in FIG. 1A. The fiber encapsulation structure 200 may encapsulate segments of the core 201 and first cladding 202 of the active, dual-clad optical fiber 156, where the second cladding has been stripped from the active, dual-clad optical fiber 156. For example, the segments of the core 201 and the first cladding 202 may be from multiple windings of the active, dual-clad optical fiber 156. Further, the fiber encapsulation structure 200 may include an optically transparent layer 204, a polymer layer 206, and a heatsink layer 208. Also illustrated in FIG. 2 are photons 212 (e.g., photons having a wavelength of 1 μm) and heat 214, both emitted from the gain medium (e.g., rare earth element, such as erbium or ytterbium) within the core 202 when the active, dual-clad optical fiber 156 is amplifying signal radiation (e.g., by being optically pumped by the multimode pump lasers 152). In alternate embodiments, the portion of the active, dual-clad optical fiber that is surrounded by the fiber encapsulation structure may not be stripped of the second cladding. For example, if the second cladding of the active, dual-clad optical fiber has a higher thermal conductivity than the polymer layer, the second cladding may not be stripped from the active, dual-clad optical fiber in the region that is surrounded by the polymer layer.

The scale of the components relative to one another, as illustrated in FIG. 2, is by way of example, and is not meant to necessarily represent actual reductions to practice. For example, the core 201 and the first cladding 202 may be smaller, in practice, relative to the optically transparent layer 204, the polymer layer 206, or the heatsink layer 208 than illustrated. Further, in some embodiments, there may only be one strand of the active, dual-clad optical fiber surrounded by the fiber encapsulation structure (as opposed to six windings, as illustrated in FIG. 2). Alternatively, there could be more windings surrounded by the fiber encapsulation structure than illustrated in FIG. 2. In still other embodiments, the fiber encapsulation structure illustrated in FIG. 2 may instead surround a fiber that is not a component of an optical fiber amplifier. For example, an optical fiber used in a transmission line that transmits signals having high peak powers may be surrounded by the fiber encapsulation structure.

The photons 212 and the heat 214 can produce adverse effects on the core 201 and the first cladding 202 if not adequately accounted for. For example, if the photons 212 and the heat 214 are not transmitted away from the active, dual-clad optical fiber 156, of which the core 201 and the first cladding 202 are a part, the fiber could end up melting and ultimately failing. The photons 212 and the heat 214 generated may be the result of the quantum defect of the gain medium being used to amplify the signal radiation in the core 201.

In order to account for the photons 212 and the heat 214 emitted by the gain medium, the fiber encapsulation structure 200 may be used to surround the core 201 and the first cladding 202. Adjacent to the first cladding 202 may be the polymer layer 206. The polymer layer 206 may be an optically transparent polymer (e.g., a silicone polymer). Further, the polymer layer 206 may have a greater thermal conductivity or thermal stability than the second cladding of the active, dual-clad optical fiber 156. For example, the polymer layer 206 may be able to withstand temperatures up to 200 degrees Celsius without melting or degrading. As such, the polymer layer is designed to conduct the photons 212 and the heat 214 generated from the quantum defect away from the core 201 and the first cladding 202. In some embodiments, the polymer layer 206 may be formed as a liquid and poured (or casted, injected, or molded) on the heatsink layer 208 and then allowed to cure in the form of a solid. Further, at the edges of the polymer layer 206 (i.e., the sides of the polymer layer 206 that are exposed to the exterior of the fiber encapsulation structure 200), the photons 212 may be transmitted away from the fiber encapsulation structure 200. In addition, the polymer layer 206 may have a refractive index lower than the refractive index of the first cladding 202 (e.g., a refractive index between 1.37 and 1.40). Thus, the pump radiation can still be effectively guided in the first cladding 202 of the active, dual-clad optical fiber 156, with the polymer layer 206 serving as a surrogate second cladding. In some embodiments, the polymer layer could replace the second cladding along the entire length of the active, dual-clad optical fiber.

Adjacent to the polymer layer 206, on one side, may be the heatsink layer 208. In some embodiments, such as the embodiment of FIG. 2, the heatsink layer 208 may be a slab of a material, such as a metal, that has a high thermal conductivity (e.g., copper). In alternate embodiments, the heatsink layer may be shaped as a half cylinder or a trough in which the core, the first cladding, and a portion of the polymer layer reside. As illustrated, the heatsink layer 208 transmits the heat 214 away from the polymer layer 206 and, thus, away from the core 201 and the first cladding 202. In some embodiments, the heatsink layer 208 may be opaque (i.e., impermeable to the photons 212 emitted due to the quantum defect). In such embodiments, the photons 212 may be reflected, or alternatively absorbed, by the heatsink layer 208.

Adjacent to the polymer layer 206, on a side opposite the heatsink layer 208, may be the optically transparent layer 204. The optically transparent layer 204 may be transparent to a range of wavelengths, including the wavelengths of the photons 212 (e.g., infrared wavelengths, such as 1 μm). The optically transparent layer 204 may transmit the photons 212 away from the polymer layer 206, and thus, away from the core 201 and the first cladding 202. The optically transparent layer 204 may be glass, in some embodiments.

Further, the optically transparent layer 204 may define the minimum distance away from the core 201 and the first cladding 202 at which the photons 212 can be absorbed. For example, if there is dust or other particles on a top surface of the optically transparent layer 204, these particles may absorb the photons 212. When the photons 212 are absorbed in such a way, heat may be produced. However, the heat may be produced at a sufficient distance, based on the location of the optically transparent layer 204, away from the core 201 and the first cladding 202 so it does not adversely affect the performance of the active, dual-clad optical fiber 156. Even further, in some embodiments, there may be an absorptive material placed on the top surface of the optically transparent material (e.g., paint applied to the top surface) to intentionally absorb the photons.

In addition, the optically transparent layer 204 may provide the fiber encapsulation structure 200 a physical barrier to mechanically protect the polymer layer 206. As illustrated, the heat 214 may not be readily transmitted by the optically transparent layer 204 like the photons 212. As with the heatsink layer 208, the shape of the optically transparent layer may also be different among various embodiments.

In some embodiments, the optically transparent layer 206 may be positioned at a certain location adjacent to the polymer layer 206 during a fabrication process while the polymer layer 206 is in a liquid form. This may define the height of the polymer layer 206 (e.g., if the polymer layer 206 is injected between the optically transparent layer 204 and the heatsink layer 208) and the position of the optically transparent layer 204. Then, as the polymer layer 206 begins to cure, the polymer layer 206 may solidify and adhere to the optically transparent layer 204. Other fabrication techniques are also possible.

Figure 3:
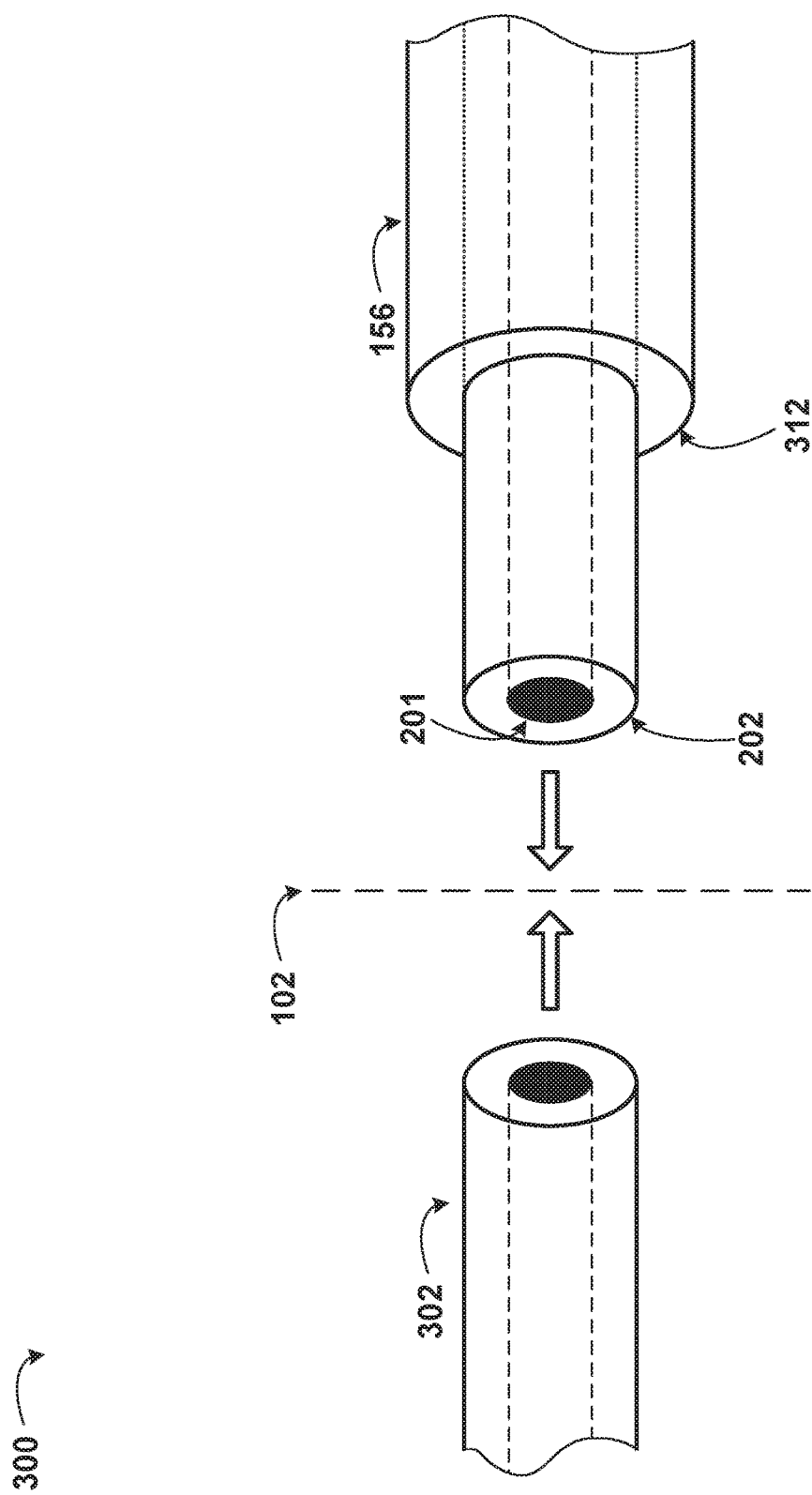
FIG. 3 is an illustration of a connection between two optical fibers, according to example embodiments.

FIG. 3 is an illustration of a connection 300 between two optical fibers, according to example embodiments. The left optical fiber 302 may be the output fiber of the multimode combiner 154 illustrated in FIG. 1A. The right optical fiber may be the active, dual-clad optical fiber 156 illustrated in FIG. 1A with the core 201 and the first cladding 202 revealed when the active, dual-clad optical fiber 156 is partially stripped of a second cladding 312. As indicated by the dashed line, the two fibers may be adjoined at a fusion splice 102. In order to fuse the two fibers at the fusion splice 102, the fibers may be heated (e.g., using a gas flame, a laser, or an electric arc).

In some embodiments, the left optical fiber may be a dual-clad optical fiber. In such embodiments, before adjoining the fibers at the fusion splice, a second cladding (e.g., a polymer) may also be stripped from the left optical fiber.

Figure 4:
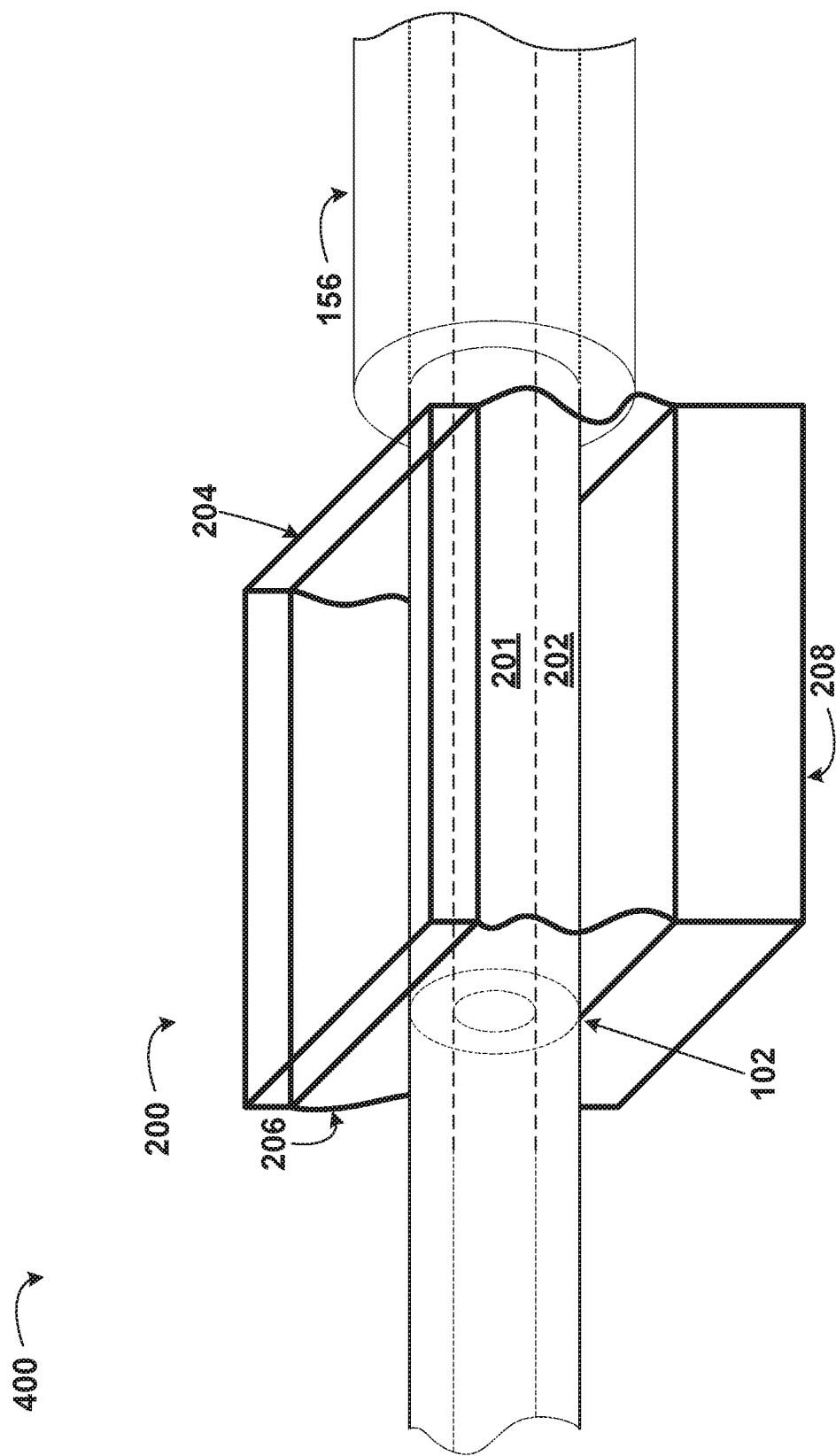
FIG. 4 is an illustration of a portion of an optical fiber amplifier, according to example embodiments.

FIG. 4 is an illustration of a portion 400 of an optical fiber amplifier, such as the optical fiber amplifier 100 of FIG. 1A. The portion 400 of the optical fiber amplifier may include the fiber encapsulation structure 200 illustrated in FIG. 2. As in FIG. 2, the fiber encapsulation structure 200 may include an optically transparent layer 204, a polymer layer 206, and a heatsink layer 208. As illustrated, the fiber encapsulation structure 200 may encapsulate the core 201 and the first cladding 202 of one or more windings of the active optical fiber 156, where the active optical fiber 156 has its second cladding partially stripped. The fiber encapsulation structure 200 may be disposed just beyond a fusion splice 102 (e.g., the fusion splice 102 of the two adjoined fibers illustrated in FIG. 3). The region just beyond the fusion splice 102 may be the location of the optical fiber amplifier 100 where signal radiation experiences the greatest amount of gain in the active optical fiber 156. Therefore, the region just beyond the fusion splice 102 may be the region with the greatest generation of excess heat and excess photons.

In alternate embodiments, an increased length of the active, dual-clad optical fiber may be surrounded by the fiber encapsulation structure. For example, a larger portion of the active, dual-clad optical fiber may be stripped of the second cladding, and multiple segments of the stripped, active, dual-clad optical fiber may be wound back and forth within the fiber encapsulation structure (similar to the cross-sectional illustration of FIG. 2). Further, in some embodiments, the fusion splice and portions of the output fiber of the multimode combiner may be surrounded by the fiber encapsulation structure. As stated previously, the size of the fibers relative to the fiber encapsulation structure 200 illustrated in FIG. 4 may be of different proportions than those used in actual reductions to practice.

The portion 400 of the optical fiber amplifier may be fabricated using a fabrication method. The method may include stripping the active, dual-clad optical fiber 156 of its second cladding, at least partially. The remaining core 201 and first cladding 202 may then be placed adjacent to an output fiber from a pre-amplifying stage of the optical amplifier (similar to the illustration of FIG. 3). In addition, the two adjacent fibers may be sufficiently heated to fuse to one another, thereby forming the fusion splice 102. Further, the core 201 and the first cladding 202 nearest to the fusion splice 102 may then be placed on the heatsink layer 208. The polymer layer 206 may then be heated and poured (or injected), in a liquid form, over the core 201 and the first cladding 202, as well as on the heatsink layer 208. The polymer layer 206 may fully engulf the core 201 and the first cladding 202, in some embodiments. The optically transparent layer 204 may then be suspended over the polymer layer 206. This suspension may happen at a height that is sufficient to ensure that the optically transparent layer 204 is not in physical contact with the first cladding 202. The polymer layer 206 may then be allowed to solidify (i.e., causing the polymer layer 206 to undergo a phase change from a liquid to a solid). In some embodiments, the optically transparent layer 204 may instead be placed over the heatsink layer 208, the core 201, and the first cladding 202 prior to pouring (or injecting) the polymer layer 206 in between the optically transparent layer 204 and the heatsink layer 208.

Figure 5:
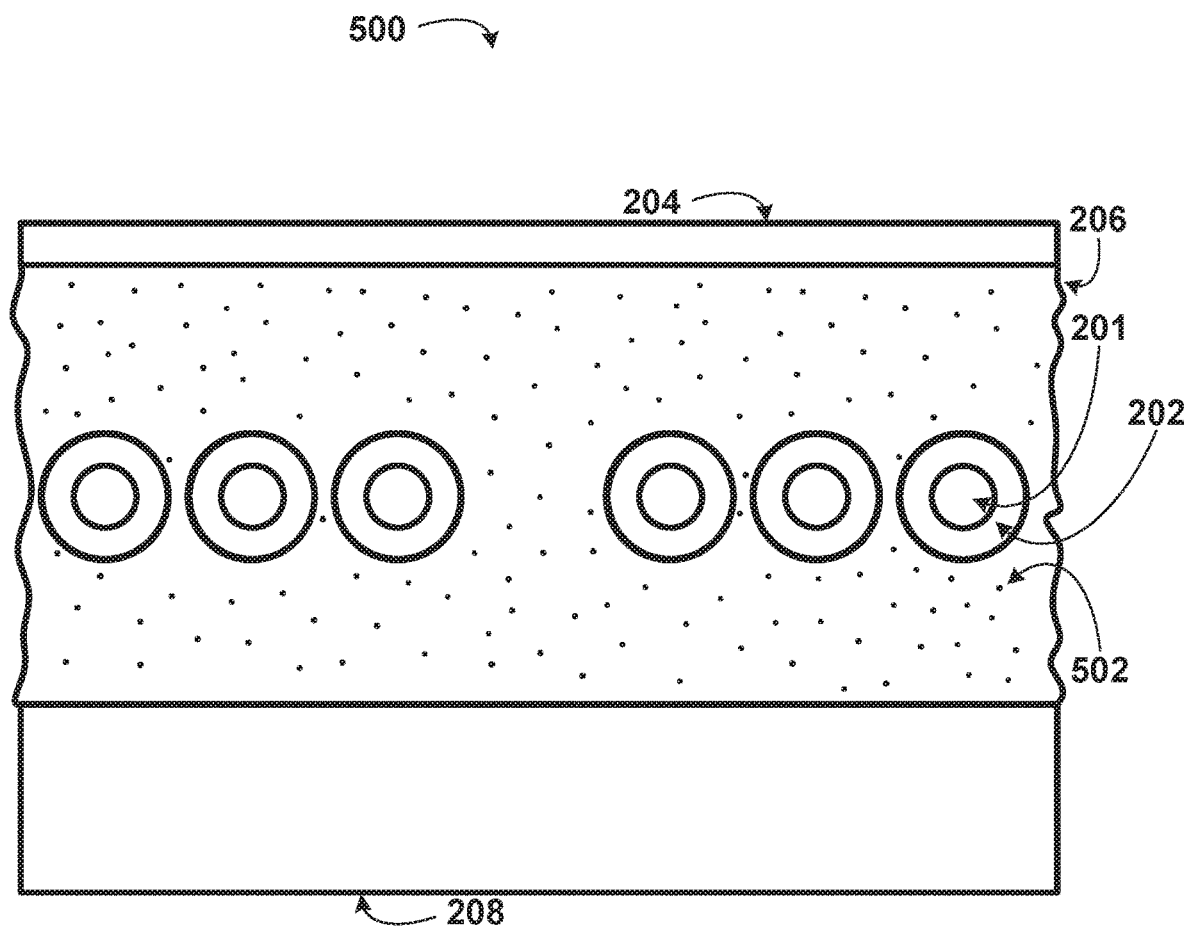
FIG. 5 is a cross-sectional illustration of a fiber encapsulation structure, according to example embodiments.

FIG. 5 is a cross-sectional illustration of a fiber encapsulation structure 500. The fiber encapsulation structure 500 may encapsulate segments of the core 201 and the first cladding 202 of the active, dual-clad optical fiber 156 from which the second cladding has been stripped. For example, the segments of the core 201 and the first cladding 202 may be multiple windings of the active, dual-clad optical fiber 156. As in the fiber encapsulation structure 200 illustrated in FIG. 2, the fiber encapsulation structure 500 may include an optically transparent layer 204, a polymer layer 206, and a heatsink layer 208. The fiber encapsulation structure 500 may additionally include a thermally conductive dopant 502. The components that are analogous to the components of FIG. 2 (i.e., the core 201, the first cladding 202, the optically transparent layer 204, the polymer layer 206, and the heatsink layer 208) may be similarly described as in FIG. 2.

The thermally conductive dopant 502 may increase the thermal conductivity of the polymer layer 206. The thermally conductive dopant 502 may also increase the thermal capacity of the polymer layer 206 without substantially decreasing the optical transparency of the polymer layer 206. Further, the thermally conductive dopant 502 may increase the rate at which the polymer layer 206 transfers heat from the core 201 and the first cladding 202 to the heatsink layer 208. In some embodiments, the thermally conductive dopant may include finely crushed Calcium Fluoride ($CaF_2$) or another binary salt of fluoride (e.g., $MgF_2$ or $BaF_2$). Additionally or alternatively, the second cladding of the active, dual-clad optical fiber 156 may be doped with a thermally conductive dopant (e.g., $CaF_2$) to increase thermal conductivity.

III. Example Processes

Figure 6:
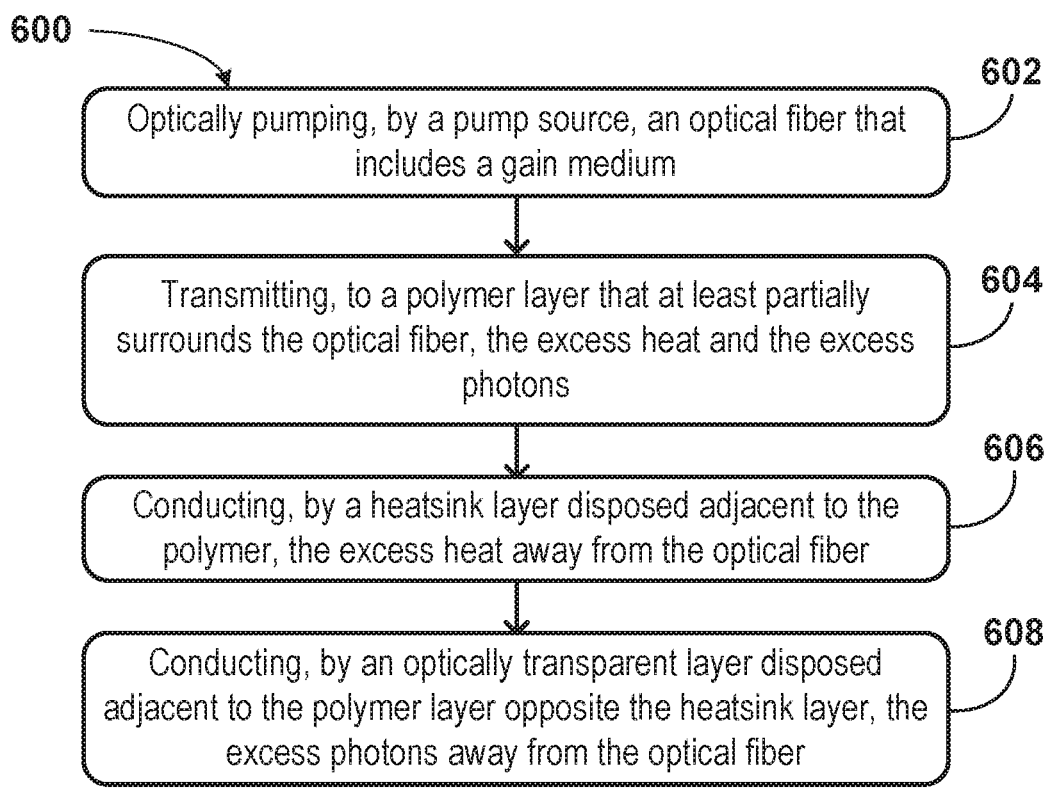
FIG. 6 is a flow chart illustration of a method, according to example embodiments.
Figure 7:
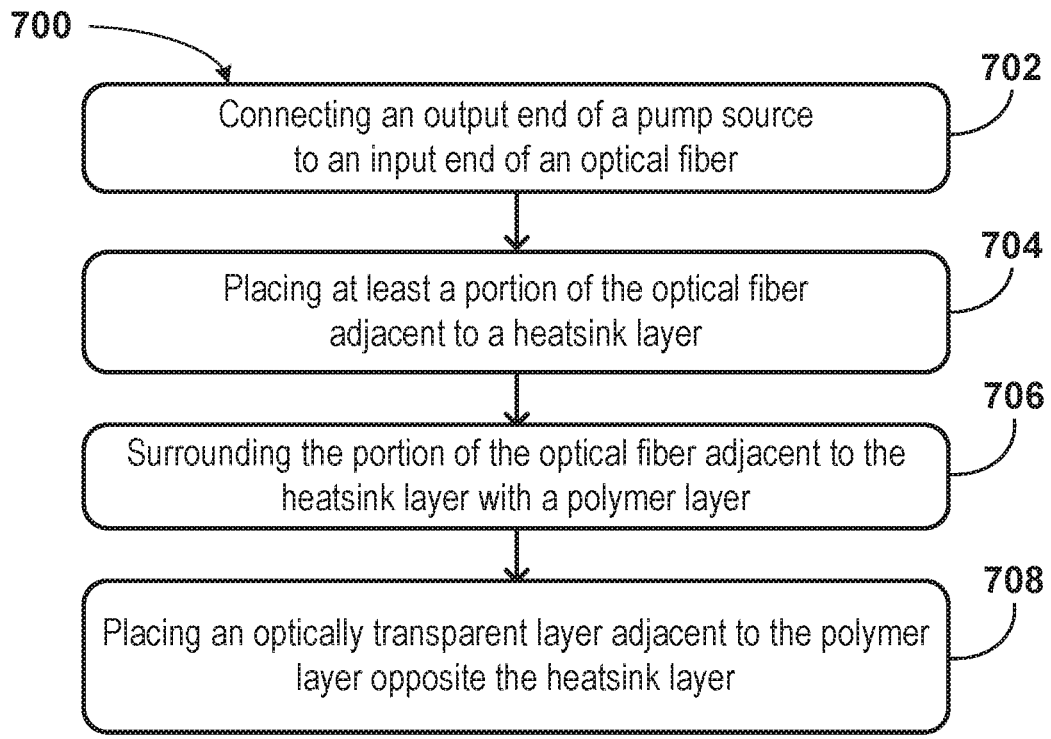
FIG. 7 is a flow chart illustration of a method, according to example embodiments.

FIGS. 6 and 7 are flowchart illustrations of methods, in accordance with example embodiments. The methods described may include one or more operations, functions, or actions as illustrated by one or more of the illustrated blocks. Although the blocks are illustrated in a sequential order, these blocks may in some instances be performed in parallel, or in a different order than those described herein. Also, the various blocks may be combined into fewer blocks, divided into additional blocks, or removed based upon the desired implementation. Further, additional blocks describing additional, non-essential steps may be included in some variations of the methods contemplated herein.

FIG. 6 is a flow chart illustration of a method 600 of amplifying light using an optical fiber amplifier, according to example embodiments.

At block 602, the method 600 includes optically pumping, by a pump source, an optical fiber that includes a gain medium (e.g., the active, dual-clad optical fiber 156 of FIG. 1A). Optically pumping by the pump source amplifies optical signals in a wavelength range transmitted through the gain medium of the optical fiber and generates excess heat and excess photons.

Block 602 may also include providing the optical signals in the wavelength range transmitted through the gain medium. For example, the optical signals may be provided by a seeding stage (e.g., the seeding stage 110 of the optical fiber amplifier 100 illustrated in FIG. 1A) and amplified by a preamplifying stage (e.g., the preamplifying stage 120 of the optical fiber amplifier 100 illustrated in FIG. 1A).

Block 602 may further include pumping the optical fiber that includes the gain medium using one or more multimode pump lasers (e.g., the multimode pump lasers 152 illustrated in FIG. 1A).

At block 604, the method 600 includes transmitting, to a polymer layer (e.g., the polymer layer 206 illustrated in FIG. 2) that at least partially surrounds the optical fiber, the excess heat and the excess photons. The polymer layer is optically transparent.

At block 606, the method 600 includes conducting, by a heatsink layer (e.g., the heatsink layer 208 illustrated in FIG. 2) disposed adjacent to the polymer, the excess heat away from the optical fiber.

At step 608, the method 600 includes conducting, by an optically transparent layer (e.g., the optically transparent layer 204) disposed adjacent to the polymer layer opposite the heatsink layer, the excess photons away from the optical fiber.

FIG. 7 is a flow chart illustration of a method 700 of fabricating an optical fiber amplifier (e.g., the optical fiber amplifier 100 illustrated in FIG. 1A or the fiber encapsulation structure 200 illustrated in FIG. 2), according to example embodiments.

At block 702, the method 700 includes connecting an output end of a pump source to an input end of an optical fiber (e.g., the active, dual-clad optical fiber 156 illustrated in FIG. 1A). The pump source is configured to optically pump the optical fiber to amplify optical signals in a wavelength range transmitted through the gain medium of the optical fiber (e.g., within an active core of the optical fiber). Optically pumping the optical fiber to amplify optical signals generates excess heat and excess photons. In some embodiments, the pump source may include multiple multimode pump lasers (e.g., the multimode pump lasers 152 illustrated in FIG. 1A).

At block 704, the method 700 includes placing at least a portion of the optical fiber adjacent to a heatsink layer (e.g., the heatsink layer 208 illustrated in FIG. 2). The heatsink layer conducts the excess heat away from the optical fiber.

At block 706, the method 700 includes surrounding the portion of the optical fiber adjacent to the heatsink layer with a polymer layer (e.g., the polymer layer 206 illustrated in FIG. 2). The polymer layer is optically transparent. Surrounding the portion of the optical fiber with the polymer layer may include, in some embodiments, pouring (or injecting) the polymer layer in a liquid form onto the heatsink layer, such that the polymer layer surrounds the optical fiber.

At block 708, the method 700 includes placing an optically transparent layer (e.g., the optically transparent layer 204) adjacent to the polymer layer opposite the heatsink layer. The optically transparent layer transmits the excess photons away from the optical fiber.

In some embodiments, the method 700 may further include curing the polymer layer so the polymer layer undergoes a phase change from a liquid to a solid and adheres to the optical fiber, the heatsink layer, and the optically transparent layer.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. An optical fiber amplifier, comprising:
   an optical fiber comprising a gain medium;
   a polymer layer that at least partially surrounds the optical fiber, wherein the polymer layer is optically transparent;
   a pump source configured to optically pump the optical fiber, wherein optical pumping by the pump source amplifies optical signals in a wavelength range transmitted through the gain medium of the optical fiber and generates excess heat and excess photons;
   a heatsink layer disposed adjacent to the polymer layer, wherein the heatsink layer conducts the excess heat away from the optical fiber; and
   an optically transparent layer disposed adjacent to the polymer layer opposite the heatsink layer, wherein the optically transparent layer transmits the excess photons away from the optical fiber, and wherein the optically transparent layer defines a minimum distance from the optical fiber at which the excess photons are absorbable.

2. The optical fiber amplifier of claim 1, wherein the optical fiber comprises a core that includes the gain medium and a cladding layer that surrounds the core.

3. The optical fiber amplifier of claim 2, wherein at least a portion of the optical fiber comprises a second cladding layer that surrounds the cladding layer.

4. The optical fiber amplifier of claim 1, wherein the gain medium comprises erbium or ytterbium.

5. The optical fiber amplifier of claim 1, wherein the wavelength range includes 1.55 μm, 1.05 μm, or 900 nm.

6. The optical fiber amplifier of claim 1, wherein the polymer layer comprises a polymer material and an additional material, and wherein the additional material increases a thermal conductivity of the polymer layer.

7. The optical fiber amplifier of claim 6, wherein the additional material comprises a binary salt of fluoride.

8. The optical fiber amplifier of claim 6, wherein the additional material does not substantially decrease the optical transparency of the polymer layer.

9. The optical fiber amplifier of claim 1, further comprising a passive optical fiber that is joined to the optical fiber comprising the gain medium at a fusion splice.

10. The optical fiber amplifier of claim 9, wherein the polymer layer surrounds the fusion splice.

11. The optical fiber amplifier of claim 1, wherein the polymer layer can withstand temperatures up to 200 degrees Celsius.

12. The optical fiber amplifier of claim 1, wherein the polymer layer has a refractive index between 1.37 and 1.40.

13. The optical fiber amplifier of claim 1, wherein the optically transparent layer comprises glass.

14. The optical fiber amplifier of claim 1, wherein the optical fiber amplifier is a transmitting component of a light detection and ranging (LIDAR) system, and wherein the optical signals are scattered by objects within a scene and detected by a receiver of the LIDAR system to analyze the scene.

15. The optical fiber amplifier of claim 1, wherein the optical fiber is less than 2 meters in length.

16. The optical fiber amplifier of claim 1, further comprising an absorptive material disposed adjacent to a top surface of the optically transparent layer.

17. The optical fiber amplifier of claim 1, wherein the optically transparent layer further mechanically protects the polymer layer from damage.

18. The optical fiber amplifier of claim 1, further comprising a pulsed seed laser, wherein the pulsed seed laser seeds the optical fiber with the optical signals in the wavelength range.

19. A method, comprising:
    optically pumping, by a pump source, an optical fiber comprising a gain medium, wherein optically pumping by the pump source amplifies optical signals in a wavelength range transmitted through the gain medium of the optical fiber and generates excess heat and excess photons;
    transmitting, to a polymer layer that at least partially surrounds the optical fiber, the excess heat and the excess photons, wherein the polymer layer is optically transparent;
    conducting, by a heatsink layer disposed adjacent to the polymer layer, the excess heat away from the optical fiber; and
    conducting, by an optically transparent layer disposed adjacent to the polymer layer opposite the heatsink layer, the excess photons away from the optical fiber, wherein the optically transparent layer defines a minimum distance from the optical fiber at which the excess photons are absorbable.

20. A method of assembling an optical fiber amplifier, comprising:
    connecting an output end of a pump source to an input end of an optical fiber, wherein the optical fiber comprises a gain medium, wherein the pump source is configured to optically pump the optical fiber to amplify optical signals in a wavelength range transmitted through the gain medium of the optical fiber, and wherein optically pumping the optical fiber to amplify optical signals generates excess heat and excess photons;
    placing at least a portion of the optical fiber adjacent to a heatsink layer, wherein the heatsink layer conducts the excess heat away from the optical fiber;
    surrounding the portion of the optical fiber adjacent to the heatsink layer with a polymer layer, wherein the polymer layer is optically transparent; and
    placing an optically transparent layer adjacent to the polymer layer opposite the heatsink layer, wherein the optically transparent layer transmits the excess photons away from the optical fiber, and wherein the optically transparent layer defines a minimum distance from the optical fiber at which the excess photons are absorbable.

21. The method of claim 20, further comprising:
    curing the polymer layer so the polymer layer undergoes a phase change from a liquid to a solid and adheres to the optical fiber, the heatsink layer, and the optically transparent layer.

* * * * *